United States Patent
Koga

[11] 3,915,060
[45] Oct. 28, 1975

[54] METHOD FOR CUTTING PAIRED GEARS HAVING ARCUATE TOOTH TRACES

[76] Inventor: Tamotsu Koga, No. 1964-14, Araki-machi, Kurume, Fukouka Prefecture, Japan

[22] Filed: Apr. 16, 1974

[21] Appl. No.: 461,396

[30] Foreign Application Priority Data
  Apr. 24, 1973  Japan.............................. 48-48884

[52] U.S. Cl........................................... 90/5; 90/9.4
[51] Int. Cl.²......................................... B23F 9/10
[58] Field of Search................................ 90/5, 9.4

[56] References Cited
UNITED STATES PATENTS

| | | | |
|---|---|---|---|
| 1,676,371 | 7/1928 | Wildhaber | 90/5 |
| 2,633,775 | 4/1953 | Wildhaber | 90/5 |

FOREIGN PATENTS OR APPLICATIONS

| | | | |
|---|---|---|---|
| 466,784 | 9/1928 | Germany | 90/5 |
| 42,459 | 12/1965 | Germany | 90/5 |

Primary Examiner—Frank T. Yost
Attorney, Agent, or Firm—McGlew and Tuttle

[57] ABSTRACT

A pair of face milling cutters are provided, one having its end face provided with a plurality of male cutting blades adapted to cut simultaneously the facing surfaces of adjacent teeth of one gear of the pair and the other having its end face provided with a plurality of female cutting blades adapted to cut simultaneously the opposite surfaces of a tooth of other of the pair of gears. The axes of the male cutting blades diverge outwardly at a predetermined angle to the axis of rotation of the associated milling cutter in a plane including the axis of rotation and the axes of diametrically opposite cutting blades, and the axes of the female cutting blades diverge inwardly at the same predetermined angle to the axis of rotation of the associated milling cutter in a plane including the axis of rotation thereof and the axes of diametrically opposite female cutting blades. The male and female cutting blades matingly mesh with each other when the two milling cutters are engaged in facing coaxial relation. The male and female face milling cutters are selectively attached to the arbor of a milling machine in such a way that the axis of rotation thereof is in coplanar relation with the pitch line of a blank gear or rack and the axis of rotation is tilted by such predetermined angle relative to a perpendicular line intersecting the tangent line to the pitch line at the center of generation of the blank gear or the pitch line of the blank rack. The tooth threads of one gear or rack blank are cut by the male blades or cutting edges moving downwardly toward the blank gear or rack as they are revolved and moving upwardly away from the gear or rack after they have cut the tooth, while the tooth threads of the other gear or pinion are cut by the female blades or cutting edges moving upwardly toward the pinion blank as they are revolved and then moving downwardly away from the pinion blank.

1 Claim, 7 Drawing Figures

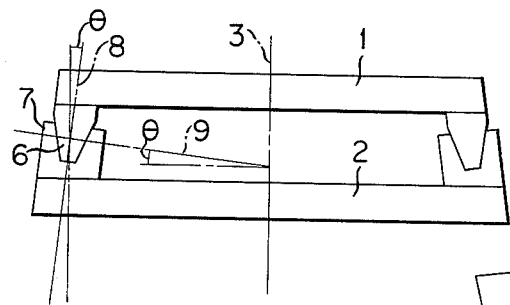
FIG. 1
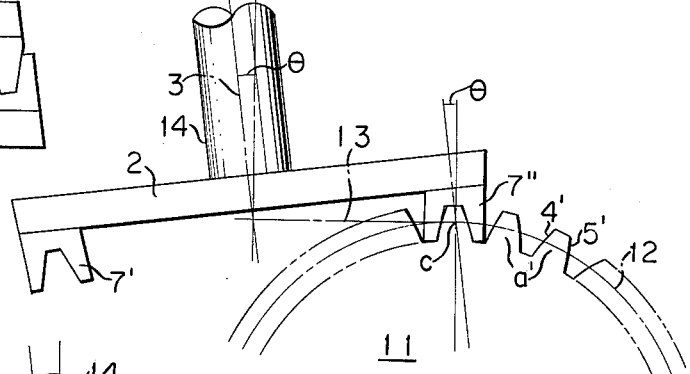
FIG. 3
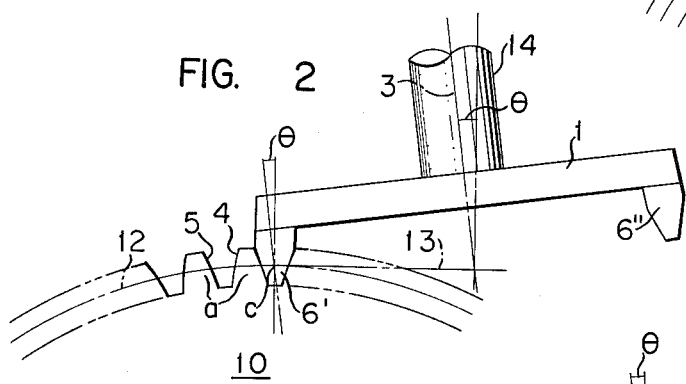
FIG. 2
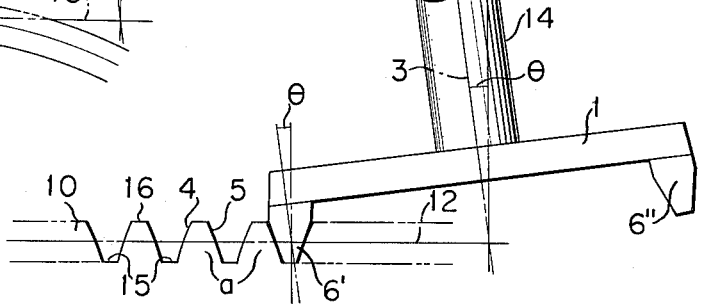
FIG. 4
FIG. 5
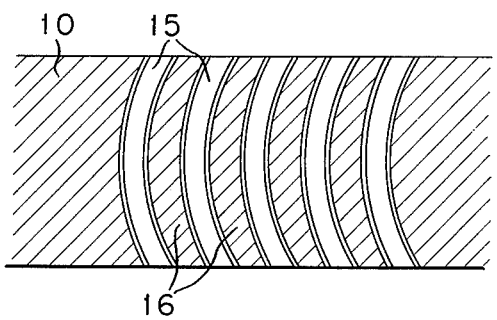
FIG. 6
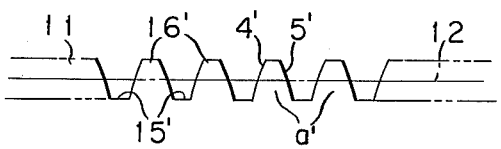
FIG. 7
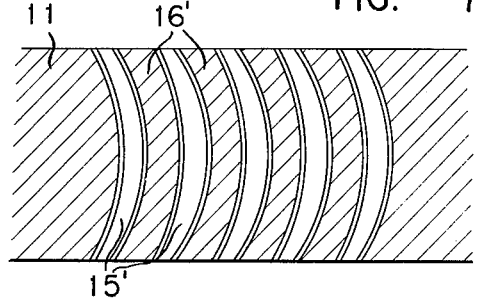

METHOD FOR CUTTING PAIRED GEARS HAVING ARCUATE TOOTH TRACES

BACKGROUND OF THE INVENTION

The present invention relates to a method and apparatus for cutting paired gears with arcuate tooth traces by utilizing a pair of face milling cutters.

In this specification and its appended claims, the term "gear" refers to various types of mechanism elements in which a plurality of gear teeth of the same profile are cut, formed, or generated not only in a surface of revolution but also in a flat surface as in the case of the racks.

In the past, the arcuate convex and concave tooth surfaces of the gear were cut by the same face milling cutter. Therefore, they had different radii of curvature which are different from each other by a distance equal to the thickness of the blades or cutting edges of the face milling cutter. In other words, the convex tooth surface of one of the paired gears had to be in mesh with the concave tooth surface of the other of the paired gears whose radius of curvature is different from that of the convex tooth surface. As a result, the teeth of the pair of gears mesh less accurately only at the center of their sides so that the strength of the teeth is adversely affected. To overcome this problem, i.e., to improve the tooth bearing, a gear cutting method has been proposed in which a pair of face milling cutters are used. One of the face milling cutters has a plurality of blades or cutting edges fixedly positioned equiangularly along the end face thereof for cutting convex tooth surfaces of the gear while the other face milling cutter has a plurality of mating female blades or cutting edges fixedly positioned equiangularly along the end face thereof for cutting concave tooth surfaces of the same gear and spaced apart from the axis of rotation by the same distance as that of the blades or cutting edges of the one face milling cutter, so that both the convex and concave blades or cutting edges are located along a circle of the same radius. Furthermore, the convex and concave blades or cutting edges are so shaped as to provide the same cone-like contour of revolution as they rotate. In the case of cutting the gear, the convex tooth surfaces of the teeth are cut by the face milling cutter having the convex blades or cutting edges and the concave tooth surfaces of the same are cut by another face milling cutter having the concave blades or cutting edges. However, the above gear cutting method is not only complex but also time-consuming because the spindle or arbor of the milling machine must be adjusted in order to index the face milling cutters with respect to a gear blank and to adjust the feeding each time when the face milling cutters are replaced. Furthermore, when the arcuate gear teeth are cut by the face milling cutters, the blade or cutting edge in diametrically opposite relation with the blade or cutting edge located in a cutting position for cutting the gear blank may interfere with the gear blank, so that gears of larger diameter cannot be cut. If the axis of rotation of the face milling cutter is slightly tilted, the teeth of a large diameter gear may be cut by the downwardly moving blades or cutting edges without interference between the large diameter gear and the blade or cutting edge which has cut the tooth and is moved upwardly away from the gear blank. But, this method has a distinct defect that the profiles of the sides of the tooth are not symmetrical, resulting in a difference in pressure angles. Thus, it has been extremely difficult to provide the arcuate teeth of a pair of gears which are completely symmetrical with each other and mesh accurately with each other.

SUMMARY OF THE INVENTION

The primary object of the present invention is therefore to provide a method and apparatus for cutting the arcuate teeth of a pair of gears which eliminate or substantially overcome the defects and problems encountered in the prior art gear cutting methods and apparatus.

Briefly stated, according to the present invention, a pair of face milling cutters respectively having a plurality of accurately mating male and female blades, or cutting edges, securely positioned along the end faces thereof, are used. The common axis of each pair of male and female blades or cutting edges when mated with each other is tilted by a predetermined angle relative to the axis of rotation of the face milling cutters in a plane containing both the common axis and the axis of rotation. More particularly, the male blade or cutting edge is tilted outwardly while the female blade or cutting edge, inwardly. In gear cutting, the axis of rotation of each face milling cutter is tilted, by a predetermined angle relative to the line perpendicular to the tangent to the pitch line in a plane containing both the axis of rotation and the pitch line. As a result, the male or female blades or cutting edges of the face milling cutter can pass through their lower and upper positions as they are revolved. One of the pair of gear blanks to be meshed with each other is cut by the male blades or cutting edges, which are moving downwardly toward the lower position, while the other gear blank is cut by the female blades or cutting edges, which are moving upwardly toward the upper position. The gear teeth thus cut accurately mesh with each other along the whole tooth width so that the strength of the teeth is considerably increased. Each gear can be cut by using a single face milling cutter. When the other face milling cutter is used, the adjustment of the feeding and tooth space is not required. Moreover, both sides of the tooth may be cut simultaneously with the result of reduction in both gear cutting time and cost. The rejection rate is also reduced. Thus, a pair of gears whose arcuate gear teeth accurately mesh with each other in an ideal manner can be manufactured quickly and simply. According to the present invention, arcuate teeth of small radii may be cut by a pair of face milling cutters of a small diameter so that the pair of gears thus cut may accomplish the function of a pair of herringbone gears.

BRIEF DESCRIPTION OF THE DRAWING

The above and other objects, features and advantages of the present invention will become more readily apparent from the following detailed description of the preferred embodiment thereof taken in conjunction with the accompanying drawing in which:

FIG. 1 is a schematic side view of a pair of face milling cutters used in the present invention;

FIG. 2 is a schematic view for explanation of cutting a gear blank by one of the pair of face milling cutters shown in FIG. 1 and having a plurality of male blades or cutting edges;

FIG. 3 is a schematic view for explanation of cutting a pinion blank by the other face milling cutter, having a plurality of female blades or cutting edges, shown in FIG. 1;

FIG. 4 is a schematic view for explanation of cutting a rack by the face milling cutter having the male blades or cutting edges;

FIG. 5 is a sectional view of the rack of FIG. 4 taken along the pitch line of the rack;

FIG. 6 is a schematic view for explanation of cutting the rack by the face milling cutter having the female blades or cutting edges; and FIG. 7 is a sectional view of the rack of FIG. 6 taken along the pitch line of the rack.

DESCRIPTION OF THE PREFERRED EMBODIMENT

Throughout the description which follows, like reference numerals indicate like elements in the various figures of the drawing.

FIG. 1 illustrates schematically a pair of face milling cutters 1 and 2 used to carry out the present invention. The face milling cutter 1 has a plurality of substantially V-shaped male blades 6 preferably equiangularly and securely held in position along the end face of a cutter body thereof for cutting tooth surfaces 4 and 5 of a tooth of a gear blank 10 (see FIG. 2). In like manner, the other face milling cutter 2 has a plurality of substantially M-shaped female blades or cutting edges 7 preferably equiangularly and securely held in position along the end face of a cutter body thereof for cutting surfaces 4' and 5' of a tooth of a gear or pinion blank 11 (see FIG. 3) which will be in mesh with the gear 10. The blades or cutting edges 6 and 7 of the pair of the face milling cutters 1 and 2 are so arranged that, when they are fitted as shown in FIG. 1, not only the axes 3 of rotation of the face miliing cutters 1 and 2, but the axes 8 of the mating male and female blades or cutting edges 6 and 7 coincide with each other. It should be further noted that the axes 8 of the blades or cutting edges 6 and 7 are tilted by an angle $\theta$ to the vertical line in a plane containing both the axes 3 and pitch lines 9 of the blades 6 and 7. That is, as shown in FIG. 1, the male blades or cutting edges 6 of the face milling cutter 1 are tilted outwardly while the female blades or cutting edges 7 of the face milling cutter 2 are tilted inwardly. In other words, the common pitch line 9 of the male and female blades or cutting edges 6 and 7 is tilted by the afore-mentioned angle $\theta$ relative to the horizontal line intersecting the axis 3 of rotation at a right angle. The profiles of both male and female cutting edges or blades 6 and 7 is symmetrical about their center axes. The angle $\theta$ is determined depending upon the height and width of the teeth to be cut, the diameter of the face milling cutters used and so on so that the male and female blades or cutting edges 6 and 7 will not interfere with the blank gear and pinion. In general, the angle $\theta$ is within a range about between 5° and 10°.

As shown in FIGS. 2 and 3, the pair of gears 10 and 11, or the pair comprising a rack 10 and a pinion 11, to be meshed with each other are cut by using the face milling cutters 1 and 2 with the construction described above with reference to FIG. 1. In gear cutting, the axis 3 of rotation of the face milling cutter 1 and the pitch line 12 of the gear or rack 10 are located in the same plane, and the axis 3 is tilted by a predetermined angle relative to the perpendicular line intersecting a tangent line 13 to the pitch line 12 of the gear at the center c of generation or to the pitch line 12 of the rack 10.

Therefore, the axis 8 of each blade or cutting edge 6 is also tilted by the predetermined angle relative to such perpendicular line as shown in FIG. 2. The above predetermined angle equals $\theta$. The same is true for the other face milling cutter 2. Therefore, when the face milling cutter 1 attached to an arbor 14 is rotated about its axis 3, a blade or cutting edge 6' is moving downwardly toward the gear or rack blank 10 to its lower position while a blade or cutting edge 6'' is moving upwardly away from the lower position and to the upper position, whereby both the surfaces 4 and 5 of the tooth $a$ of the gear or rack 10 may be generated or formed simultaneously (see FIGS. 2 and 4). Since the blade or cutting edge 6'' moved upwardly away from the gear or rack blank 10 after it has cut it, it will not interfere with the gear or rack blank 10 while the downwardly moving blade or cutting edge 6' is cutting the tooth. Since the rack 10 is a gear of infinite radius, its tooth $a$ may be formed only by feeding the face milling cutter 1 or 2 in the direction of the width of the rack blank (see FIG. 4).

The pinion blank 11 which will be meshed with the gear or rack 10 generated or formed in the manner described above is cut by the other face milling cutter 2 in a manner substantially similar to that described above except that the upwardly moving female blade or cutting edge 7'' cuts the blank pinion 11 while the downwardly moving blade or cutting edge 7' which has cut the pinion blank 11 is moved downwardly without any interference as it revolves about the axis 3 as shown in FIG. 3. Thus, both the surfaces 4' and 5' of the tooth $a'$ of the pinion 11 may be generated. It is preferable to select the diameter of the pinion blank 11 so that the downwardly moving blades or cutting edges 7' will not interfere with the pinion blank 11. The pressure angles at both the surfaces 4' and 5' of the generated tooth $a'$ are the same.

As shown in FIG. 5, the tooth space 15 of the gear or rack 10 cut by the face milling cutter 1 with the male or V-shaped blades or cutting edges 6 is constant from one end to the other end, but the tooth land 16 is slightly thicker at the center than at the other portions. As shown in FIG. 7, the tooth land 16' of the pinion 11 cut by the female face milling cutter 2 is constant from one end to the other end while the tooth space 15' is wider at the center than at the other portions. Therefore, the tooth lands 16 of the gear or rack 10 (see FIG. 5) are in accurate mesh with the tooth spaces 15' of the mating pinion 11 (see FIG. 7) in an ideal manner, and an improved tooth bearing is developed therebetween along the whole width of the teeth.

What is claimed is:

1. A method for cutting arcuate threads of a pair of gears to be meshed with each other, said method comprising the steps of providing a pair of rotatable face milling cutters, one having its end face provided with a plurality of male cutting blades at equiangular spacings adapted to cut simultaneously the facing surfaces of adjacent teeth of one gear and the other having its end face provided with a plurality of female cutting blades at equiangular spacings adapted to cut simultaneously the opposite surfaces of a tooth of the other gear, with the axes of the male cutting blades diverging outwardly at a predetermined angle to the axis of rotation of the one milling cutter in a plane including the axis of rotation and the axes of diametrically opposite cutting blades, and the axes of the female cutting blades converging inwardly at the same predetermined angle to the axis of rotation of the other milling cutter in a plane including the axis of rotation of the other milling cutter and the axes of diametrically opposite female cutting blades, the male and female cutting blades matingly meshing with each other when the two milling cutters are engaged in facing coaxial relation; placing each face milling cutter in operative gear tooth cutting relation with a respective one of the pair of gears to be meshed with each other, with the axis of rotation of each milling cutter lying in a common plane with a pitch line of the pair of gears to be meshed with each other; tilting the axis of rotation of each gear to extend at such predetermined angle relative to a line perpendicular to the tangent line to the pitch line of the pair of gears to be meshed with each other, so that, when each face milling cutter is rotated about its axis, the respective cutting blades thereof move, relative to the associated gear to be cut, between upper and lower positions; rotating the one milling cutter to cut the teeth of the associated one of the pair of gears by the male cutting blades moving downwardly through the lower position thereof and, after cutting, moving upwardly through the upper position thereof; and rotating the other of the face milling cutters to cut the other of the pair of gears to be meshed by the female cutting blades moving through the associated upper position when cutting the gear teeth and then moving away from the associated gear through the associated lower position.

* * * * *